UNITED STATES PATENT OFFICE.

EMILE BRONNERT, OF NIEDERMORSCHWEILER, GERMANY, ASSIGNOR TO VEREINIGTE GLANZSTOFF-FABRIKEN-A.-G., OF ELBERFELD, GERMANY.

PRODUCTION OF VISCOUS CELLULOSE SOLUTIONS.

1,055,513. Specification of Letters Patent. Patented Mar. 11, 1913.

No Drawing. Application filed February 11, 1911. Serial No. 608,108.

*To all whom it may concern:*

Be it known that I, EMILE BRONNERT, a subject of the German Emperor, residing at Niedermorschweiler, Germany, have invented certain new and useful Improvements in the Production of Viscous Cellulose Solutions, of which the following is a specification.

This invention relates to a method of producing durable, easily preservable and not easily to be spoiled viscous cellulose solutions.

It relates further to a method in which the cellulose solutions are obtained from cellulose in any form.

It relates particularly to a method in which the waste products of the artificial silk industry, say cellulose e. g. are subjected to the action of concentrated phosphoric acid and formic acid.

It is well known that the hydrates of a certain composition occurring as waste products in the manufacture of artificial silk, when treated in formic acid, form, after some time and under ordinary temperature, without the addition of a condensation medium, and under formation of esters, a technically important solution of cellulose formate in formic acid. Ordinary bleached or mercerized cellulose does not dissolve under these circumstances. Now I have discovered that by using a mixture of formic acid and concentrated phosphoric acid ordinary cellulose can also be brought into solution. Of course also the altered cellulose known as waste products in the artificial silk industry, (for example, the luster-silk (*glanzstoff*), viscous-silk, denitrated nitro-silk), pass into solution under these circumstances, possibly with the formation of new acid combinations. In fact, cellulose products of any form (unaltered, altered, waste, etc.) may be used in carrying out the invention. It is also known that acetic acid and phosphoric acid are suitable for effecting solutions of cellulose. In comparison therewith, the mixture of phosphoric and formic acids possesses not only the advantage of greater economy, but the solution takes place in a few hours, and forms a formic cellulose ester. The introduced artificial silk waste products dissolve uniformly melting (so to say) just as the colloid gum arabic changes to a slime in water. There is, therefore, an important technical difference and advance over the application of acetic acid. The higher fatty acids do not behave similarly as assisting solution or preventing decomposition, so that the behavior of the formic acid is to be considered as characteristic.

As an example: Into 1 kilogram of concentrated formic acid (about 99%) mixed with 1 kilogram of concentrated phosphoric acid, there are stirred 200 grams of slightly bleached cotton. After a few hours, without further stirring, the cellulose yields a syrupy viscous liquid.

In the above example, if the cotton is replaced by artificial silk waste, in half the time already a syrup colored only slightly yellow is obtained.

The solutions thus prepared are applicable for the manufacture of threads, etc., from which in practice the phosphoric acid can be removed in any suitable manner, such e. g. as washing. The product obtained by precipitating the solutions, and practically after the removal of the phosphoric acid residue, can also be used if desired for the manufacture of noninflammable celluloid-like substances by mixing with camphor or camphor-substitutes such as triphenylphosphate for instance.

Having thus fully set forth my method, and the manner in which it is to be carried out, what I claim is:—

1. The method of producing viscous, relatively stable easily preservable cellulose solutions, which consists in subjecting cellulosic material to the action of concentrated phosphoric and formic acids.

2. The method of producing cellulose solutions, which consists in subjecting waste cellulose hydrates from the artificial silk industry to the action of concentrated phosphoric acid and formic acid.

3. The method of producing viscous cellulose solutions, which consists in forming a mixture composed of equal parts of concentrated phosphoric acid and formic acid and dissolving therein cellulosic material in amount by weight, equal to about one-tenth of the weight of the acid mixture.

In witness whereof, I have hereunto signed my name in the presence of two subscribing witnesses.

EMILE BRONNERT.

Witnesses:
 HENRY HASPER,
 RICHARD GOETZ.